US009054520B2

(12) United States Patent
Worley et al.

(10) Patent No.: US 9,054,520 B2
(45) Date of Patent: Jun. 9, 2015

(54) ESD CLAMPING TRANSISTOR WITH SWITCHABLE CLAMPING MODES OF OPERATION

(71) Applicant: QUALCOMM Incorporated, San Diego, CA (US)

(72) Inventors: Eugene R. Worley, Irvine, CA (US); Mingliang Wang, San Diego, CA (US); Ankit Srivastava, San Diego, CA (US); Song S. Shi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 203 days.

(21) Appl. No.: 13/745,949

(22) Filed: Jan. 21, 2013

(65) Prior Publication Data

US 2014/0204488 A1    Jul. 24, 2014

(51) Int. Cl.
*H02H 9/00* (2006.01)
*H02H 9/04* (2006.01)

(52) U.S. Cl.
CPC ..................... *H02H 9/046* (2013.01)

(58) Field of Classification Search
CPC ........................................................ H02H 9/046
USPC ............................................................ 361/56
See application file for complete search history.

(56) References Cited

U.S. PATENT DOCUMENTS

| 6,043,969 | A | 3/2000 | Sharpe-Geisler | |
|---|---|---|---|---|
| 6,724,603 | B2 | 4/2004 | Miller et al. | |
| 7,466,527 | B1 * | 12/2008 | Juang | 361/56 |
| 8,000,068 | B2 * | 8/2011 | Brown et al. | 361/56 |
| 8,009,399 | B2 * | 8/2011 | Lai | 361/56 |
| 8,072,722 | B1 | 12/2011 | Hwang | |
| 8,116,048 | B1 * | 2/2012 | Gallerano et al. | 361/56 |
| 2005/0224882 | A1 | 10/2005 | Chatty et al. | |
| 2009/0231766 | A1 | 9/2009 | Chang et al. | |
| 2012/0091530 | A1 | 4/2012 | Campi, Jr. et al. | |
| 2012/0236444 | A1 | 9/2012 | Srivastava et al. | |

OTHER PUBLICATIONS

Allen, P.E., "Lecture 080—Latchup and ESD Lecture Organization," <www.aicdesign.org/SCNOTES/2010notes/Lect2UP080_(100324).pdf> Mar. 24, 2010, 16 pages.
Anzai, Hiromi et al., "Equivalent Circuit Model of ESD Protection Devices," FUJITSU Sci. Tech. J., <www.fujitsu.com/downloads/MAG/vol39-1/paper14.pdf> Jun. 2003, vol. 39-1, pp. 119-127.
Beebe, Stephen G., "Characterization, Modeling, and Design of ESD Protection Circuits," <www-tcad.stanford.edu/tcad/pubs/theses/sbeebe.pdf> Mar. 1998, Sunnyvale, CA, 222 pages.
Sarbishaei, Hossein, "Electrostatic Discharge Protection Circuit for High-Speed Mixed-Signal Circuits," University of Waterloo, Ontario, Canada, 2007, 141 pages.

* cited by examiner

*Primary Examiner* — Stephen W Jackson
(74) *Attorney, Agent, or Firm* — Toler Law Group, PC

(57) ABSTRACT

In a particular embodiment, an apparatus includes an electrostatic discharge (ESD) clamping transistor coupled to a ground terminal of a device. The apparatus further includes a switch coupled between a body terminal of the ESD clamping transistor and the around terminal.

35 Claims, 6 Drawing Sheets

ESD CLAMPING TRANSISTOR WITH SWITCHABLE CLAMPING MODES OF OPERATION

I. FIELD

The present disclosure is generally related to electronic devices and more particularly to electronic devices that include electrostatic discharge (ESD) protection circuitry.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities, which may be implemented using integrated circuits.

Electrostatic discharge (ESD) may occur due to transfer of charge from an object or a person to an integrated circuit. ESD can severely alter operation of the integrated circuit or cause damage to the integrated circuit (e.g., by damaging gate oxide layers of transistors of the integrated circuit), thereby damaging an electronic device that utilizes the integrated circuit.

III. SUMMARY

According to certain conventional techniques, an electronic device may include off-chip electrostatic discharge (ESD) protection circuits that are external to an integrated circuit. Because such off-chip protection circuits may be associated with higher cost and printed circuit board area, some integrated circuits may include ESD protection on-chip, such as using a snapback transistor clamp that utilizes a parasitic bipolar effect to dissipate current during an ESD event. However, the snapback transistor clamp may be associated with a large ballasting resistance. The large ballasting resistance may occupy significant circuit area and may increase capacitance associated with the snapback transistor clamp.

In accordance with at least one embodiment of the present disclosure, an ESD clamping transistor has a triple-well configuration that enables the ESD clamping transistor to "float" a body terminal of the ESD clamping transistor during one mode of operation and to "tie" the body terminal to a ground terminal during another mode of operation. Because floating the body terminal may cause the ESD clamping transistor to enter a "snapback" mode of operation (e.g., a parasitic bipolar mode of operation) faster as compared to tying the body terminal to the ground terminal, the floating mode of operation may be preferable when rapid initiation of the parasitic bipolar mode of operation is desirable in response to an ESD event (e.g., while the apparatus is not being operated). During operation of the apparatus (e.g., while the apparatus is receiving power), the body terminal may be tied to the ground terminal to reduce instances of the ESD clamping transistor turning on "too easily." For example, during operation of the apparatus and depending on the particular application, certain voltage deviations or fluctuations may be tolerable and may not indicate an ESD event. Accordingly, the "tied" mode of operation of the ESD clamping transistor may be appropriate during normal operation of the apparatus.

In a particular embodiment, an apparatus includes an electrostatic discharge (ESD) clamping transistor coupled to a ground terminal of a device. The apparatus further includes a switch coupled between a body terminal of the ESD clamping transistor and the ground terminal.

In another particular embodiment, a method includes selectively decoupling a body terminal of an electrostatic discharge (ESD) clamping transistor from a ground terminal of a device based on a mode of operation of the ESD clamping transistor.

In another particular embodiment, an apparatus includes an electrostatic discharge (ESD) clamping transistor coupled to a ground terminal of a device. The apparatus further includes means for selectively decoupling a body terminal of the ESD clamping transistor from the ground terminal based on a mode of operation of the ESD clamping transistor.

In another particular embodiment, a method includes a step for selectively decoupling a body terminal of an electrostatic discharge (ESD) clamping transistor from a ground terminal of a device based on a mode of operation of the ESD clamping transistor.

In another particular embodiment, a non-transitory computer-readable medium stores instructions executable by a computer. The instructions are executable by the computer after a power-up sequence. The power-up sequence includes selectively coupling a body terminal of an electrostatic discharge (ESD) clamping transistor to a ground terminal of a device based on a mode of operation of the ESD clamping transistor.

One particular advantage provided by at least one of the disclosed embodiments is that a threshold associated with initiation of parasitic bipolar operation of an electrostatic discharge (ESD) clamping transistor may be controlled. For example, rapid initiation of the parasitic bipolar operation may be desirable in some cases, while in other cases an increased "tolerance" to voltage fluctuations may be more appropriate. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 5:
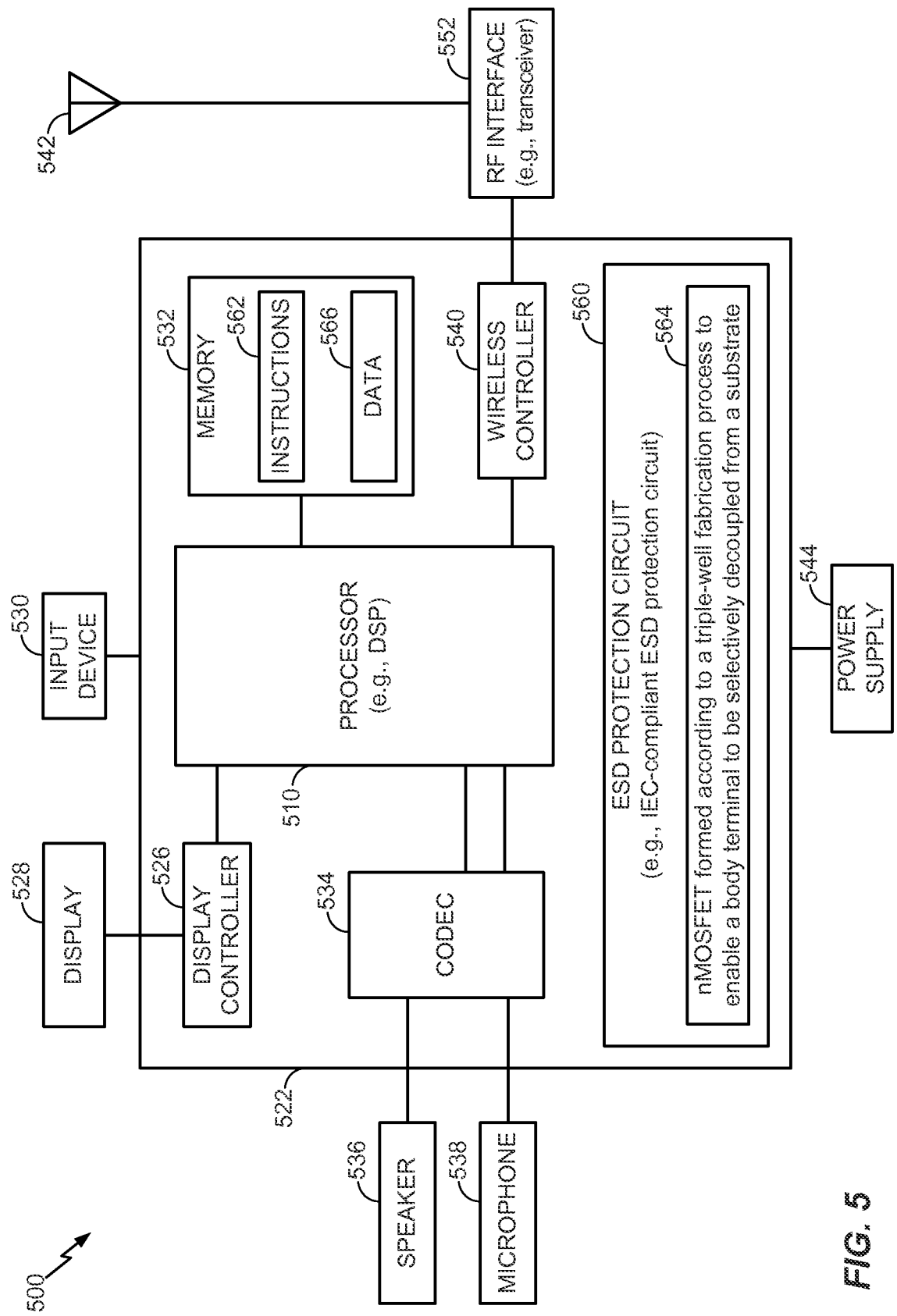
Figure 6:
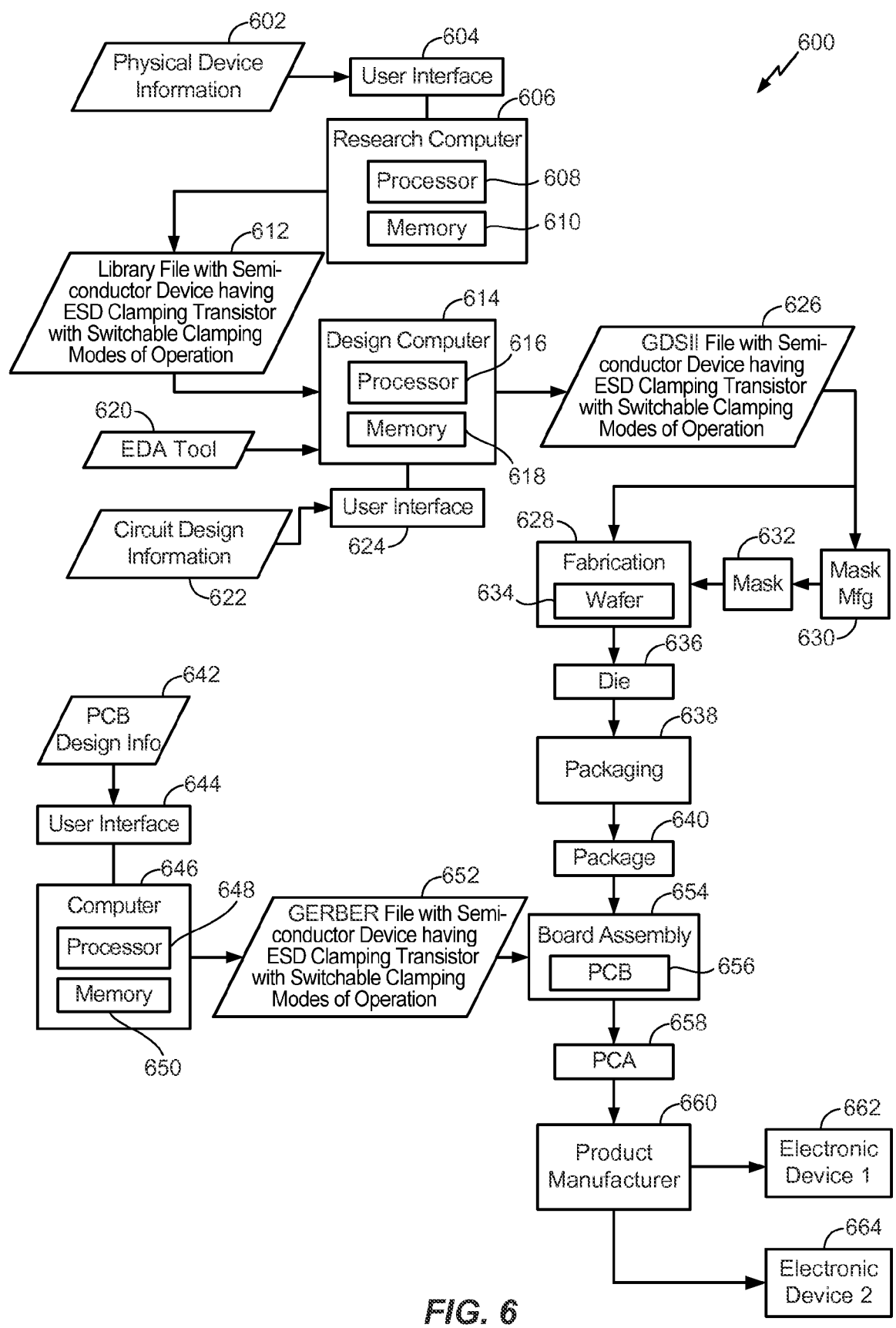

FIG. 5 is a diagram of an illustrative embodiment of a mobile device including an n-channel metal-oxide-semiconductor field effect transistor (nMOSFET) formed according to a triple-well fabrication process to enable a body terminal to be selectively decoupled from a substrate; and FIG. 6 is a data flow diagram of a particular illustrative embodiment of a manufacturing process to manufacture electronic devices that include an ESD clamping transistor with switchable clamping modes of operation.

V. DETAILED DESCRIPTION

Figure 1:
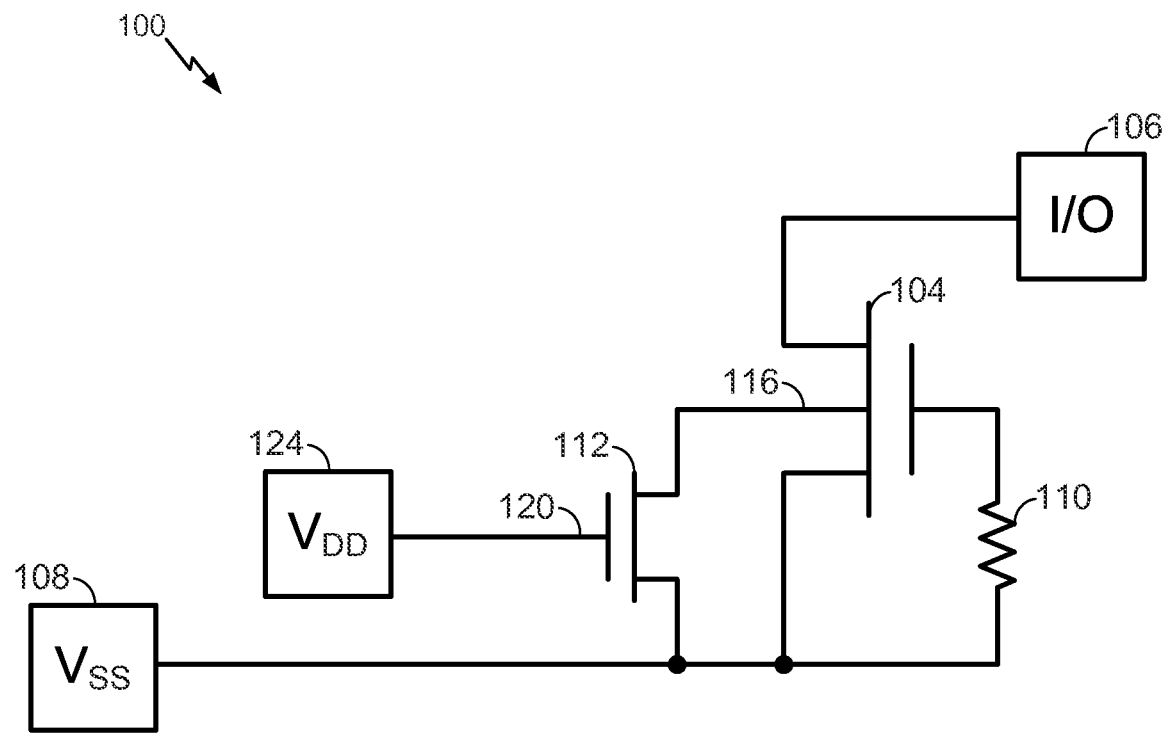
FIG. 1 is a diagram of an illustrative embodiment of a device that includes an electrostatic discharge (ESD) clamping transistor with switchable clamping modes of operation.

Referring to FIG. 1, a particular embodiment of a device (e.g., a semiconductor device, such as a portion of an integrated circuit) is depicted and generally designated 100. The device 100 includes an electrostatic discharge (ESD) clamping transistor 104 (e.g., a "snapback" ESD clamping transistor) coupled to a ground terminal 108 (illustrated as "$V_{SS}$" in the example of FIG. 1). The ground terminal 108 may be a node of the device 100 that is biased according to a low or zero voltage.

The ESD clamping transistor 104 includes a body terminal 116. In a particular embodiment, the ESD clamping transistor 104 is compliant with one or more standards promulgated by the International Electrotechnical Commission (IEC), the Joint Electron Devices Engineering Council (JEDEC), the American National Standards Institute (ANSI), the ESD Association (ESDA), or a combination thereof. As described further below, the ESD clamping transistor 104 may have a triple-well configuration and may be formed according to a triple-well fabrication process to enable the body terminal 116 to be decoupled from a substrate of the device 100 (e.g., a substrate upon which transistors, such as the ESD clamping transistor, are formed). In a particular illustrative embodiment, the ESD clamping transistor 104 has a width of approximately 3600 micrometers (μm), although the ESD clamping transistor 104 may be of a different width depending on the particular application.

As illustrated in FIG. 1, the device 100 may further include a switch 112, such as an n-channel metal-oxide-semiconductor field effect transistor (nMOSFET), coupled between the body terminal 116 of the ESD clamping transistor 104 and the ground terminal 108. A control terminal 120 of the switch 112 is coupled to a power terminal 124 (illustrated as "$V_{DD}$" in the example of FIG. 1) of the device 100. The switch 112 may be associated with a particular body-to-ground resistance (e.g., a resistance associated with the path from the body terminal 116 to the ground terminal 108). For example, the switch 112 may be associated with a body-to-ground resistance of less than 100 ohms ($\Omega$), though the body-to-ground resistance may be a different value depending on the particular application.

The device 100 may further include a resistor 110 coupled to a gate of the ESD clamping transistor 104 and an input/output (I/O) interface 106 (e.g., an interface configured to send and receive data signals of an integrated circuit into which the device 100 is integrated) coupled to the ESD clamping transistor 104. The I/O interface 106 may be coupled to additional circuitry, devices, or a combination thereof, not shown in FIG. 1.

In operation, the body terminal 116 of the ESD clamping transistor 104 may be selectively coupled to and selectively decoupled from the ground terminal 108 of the device 100 based on a mode of operation of the ESD clamping transistor 104. For example, in response to the power terminal 124 being unbiased, the body terminal 116 may "float" (e.g., may be electrically decoupled from the ground terminal 108 via the switch 112). Therefore, ESD at the I/O interface 106 that occurs while the device 100 is powered down (e.g., while the power terminal 124 is unbiased) may be discharged via the ESD clamping transistor 104 while the ESD clamping transistor 104 is operating according to a "floating" mode of operation (e.g., while the body terminal 116 is not electrically coupled to the ground terminal 108 via the switch 112).

In at least one embodiment, the ESD clamping transistor 104 has a triple-well configuration that isolates the body terminal 116 within a "deep well" (e.g., a deep n-well) to enable the floating mode of operation (e.g., to enable the body terminal 116 to be selectively decoupled from the substrate of the device 100). Thus, due to the isolation of the body terminal 116 from the substrate (e.g., via the deep well), in at least one mode of operation, the body terminal 116 "floats" during at least one mode of operation of the ESD clamping transistor 104.

Hence, a "negative resistance" region of operation associated with parasitic bipolar operation of the ESD clamping transistor 104 may be reduced. That is, a "trigger" voltage of the ESD clamping transistor 104 (i.e., a drain voltage in response to which the ESD clamping transistor 104 begins parasitic bipolar operation) may be nearer or at a holding voltage of the ESD clamping transistor 104 (i.e., a drain voltage to which the ESD clamping transistor 104 "snaps back" during the parasitic bipolar operation). For example, in some applications, the trigger voltage of the ESD clamping transistor 104 while operating according to the "floating" mode of operation may be reduced by approximately one volt as compared to when the body terminal 116 is coupled to the ground terminal 108. Therefore, by reducing the "negative resistance" region of operation of the ESD clamping transistor 104, more uniform triggering operation of the ESD clamping transistor 104 may be facilitated in at least some applications. Also, the holding voltage of the ESD clamping transistor 104 is reduced by floating the body terminal 116, thereby reducing the ESD power dissipation of the ESD clamping transistor 104, improving triggering uniformity associated with the ESD clamping transistor 104, and providing for greater protection of circuit elements that may be connected to the I/O interface 106.

Further, during a second mode of operation (e.g., after the device 100 has been powered up), the ESD clamping transistor 104 may enter a "tied" mode of operation that increases the trigger voltage of the ESD clamping transistor 104. Increasing the trigger voltage may avoid entering parasitic bipolar operation too early (e.g., avoid clamping in response to a drain voltage of the ESD clamping transistor 104 that does meet a particular threshold). For example, in response to a voltage increase at the power terminal 124 (e.g., during a power-up sequence), the switch 112 may couple the body terminal 116 to the ground terminal 108 (e.g., may "tie" the body terminal 116 to the ground terminal 108). Hence, FIG. 1 depicts at least one embodiment in which the body terminal 116 may be selectively coupled to the ground terminal 108 (e.g., based on the first or second modes of operation and based on the switch 112 as described with reference to FIG. 1).

As will be appreciated, although ESD events at the I/O interface 106 have been described with reference to FIG. 1, devices and methods described herein may be applicable to ESD events at other structures (e.g., other regions of an integrated circuit), depending on the particular application. In addition, the resistor 110 of FIGS. 1-3 may be omitted or may have 0 ohms ($\Omega$) of resistance, thereby producing a gate short from the ESD clamping transistor 104 to the ground terminal 108 (e.g., forming a Grounded Gate (GG) NFET). Also, other circuitry can be connected to the gate of the ESD clamping transistor 104 to control the gate voltage during an ESD event and/or normal operating conditions, as can be appreciated by one of skill in the art.

Figure 2:
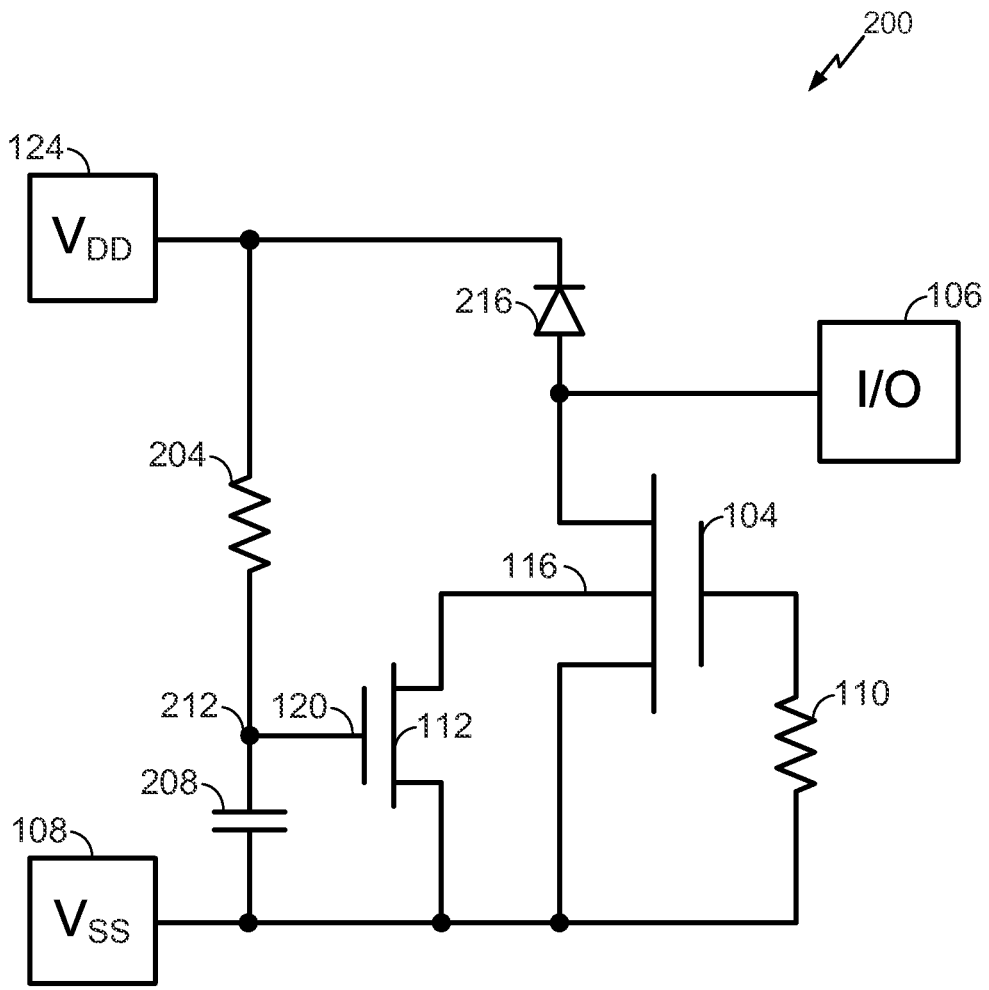
FIG. 2 is a diagram of another illustrative embodiment of a device that includes an ESD clamping transistor with switchable clamping modes of operation.

Referring to FIG. 2, another particular embodiment of a device (e.g., a semiconductor device, such as a portion of an integrated circuit) is depicted and generally designated 200. One or more components of the device 200 may be described with reference to the device 100 of FIG. 1. For example, the device 200 of FIG. 2 includes the ESD clamping transistor 104, the I/O interface 106, the ground terminal 108, the resistor 110, the switch 112, and the power terminal 124. The ESD clamping transistor 104 includes the body terminal 116. The switch 112 includes the control terminal 120.

In at least one embodiment, a "pad-to-$V_{DD}$" device, such as a diode 216, is coupled between the power terminal 124 and the I/O interface 106. The "pad-to-$V_{DD}$" device may include a p-channel metal-oxide-semiconductor field effect transistor (pMOSFET) (not shown in FIG. 2) or a discrete diode.

The device 200 of FIG. 2 further includes a resistor 204 and a capacitor 208 forming a resistive-capacitive (RC) circuit associated with an RC time constant. The control terminal 120 of the switch 112 is coupled to a node 212 of the RC circuit. The RC circuit introduces a delay period (e.g., a delay period based at least partially on the RC time constant) prior to activating the switch 112 following a voltage increase at the power terminal 124, as described further below. The delay period may be further based on other parameters of the device 200 (e.g., parasitic capacitances associated with the device 200) depending on the particular application. In at least one embodiment, the delay period is of a duration to ensure that the ESD clamping transistor 104 fully conducts during an ESD event before the switch 112 ties the body terminal 116 to the ground terminal 108. The ESD event may be associated with various ESD stress conditions, such as a human body model (HBM) stress condition, a charged device model (CDM) stress condition, an IEC 61000-4-2 stress condition, or a combination thereof.

In operation, an ESD event may occur (e.g., at the I/O interface 106) during a power-up sequence of the device 200 (e.g., while a voltage at the power terminal 124 is increased from an unbiased state to a biased state, such as a state $V_{DD}$). The delay period of the RC circuit may enable the switch 112 to remain "off" during the duration of the ESD event (e.g., by maintaining the node 212 at a voltage insufficient to activate the switch 112). Because the delay period may be of a longer duration than the ESD event, the ESD clamping transistor 104 may remain in the floating mode of operation during the ESD event. Further, because the floating mode of operation is associated with a high body-to-ground resistance of the ESD clamping transistor 104 as compared to the tied mode of operation, causing the body terminal 116 to float (e.g., during the delay period) may enable the ESD clamping transistor 104 to clamp (e.g., begin discharging current associated with the ESD event) more rapidly as compared to the tied mode of operation.

After the ESD event, the switch 112 may couple the body terminal 116 to the ground terminal 108 (e.g., the body terminal 116 may transition from being uncoupled from the ground terminal 108 to being coupled to the ground terminal 108 via the switch 112). For example, after the delay period, the node 212 may be charged to a voltage sufficient to activate the control terminal 120 of the switch 112, thereby tying the body terminal 116 to the ground terminal 108. As explained further below, in at least one embodiment, the delay period is of a shorter duration than a duration associated with the power-up sequence. Accordingly, the ESD clamping transistor 104 may enter the "tied" mode of operation prior to the power terminal 124 reaching a normal operating voltage (e.g., $V_{DD}$).

In a particular illustrative embodiment, the RC time constant is approximately 100 nanoseconds (ns), although the RC time constant may be a different value depending on the particular application. For example, parameters of the RC circuit (e.g., a resistance of the resistor 204, a capacitance of the capacitor 208, or a combination thereof) may be selected to achieve a particular RC time constant based on the particular application. In some applications, the device 200 does not include the capacitor 208, such as if a capacitance (e.g., a gate-to-source capacitance) associated with the switch 112 meets a particular threshold.

A duration associated with a power-up sequence at the power terminal 124 (e.g., a power-up ramp time) may be greater than the RC time constant associated with the RC circuit. For example, in applications where a large filter capacitor is coupled to the power terminal 124, the power-up ramp time may be 20 microseconds (µs) or more. Accordingly, during the power-up sequence, the control terminal 120 may become sufficiently charged to activate the switch 112 prior to the power terminal 124 "ramping up" to a normal operating voltage (e.g., a voltage $V_{DD}$). Accordingly, the body terminal 116 may be coupled to the ground terminal 108 via the switch 112 prior to the power terminal 124 reaching the normal operating voltage.

Figure 3:
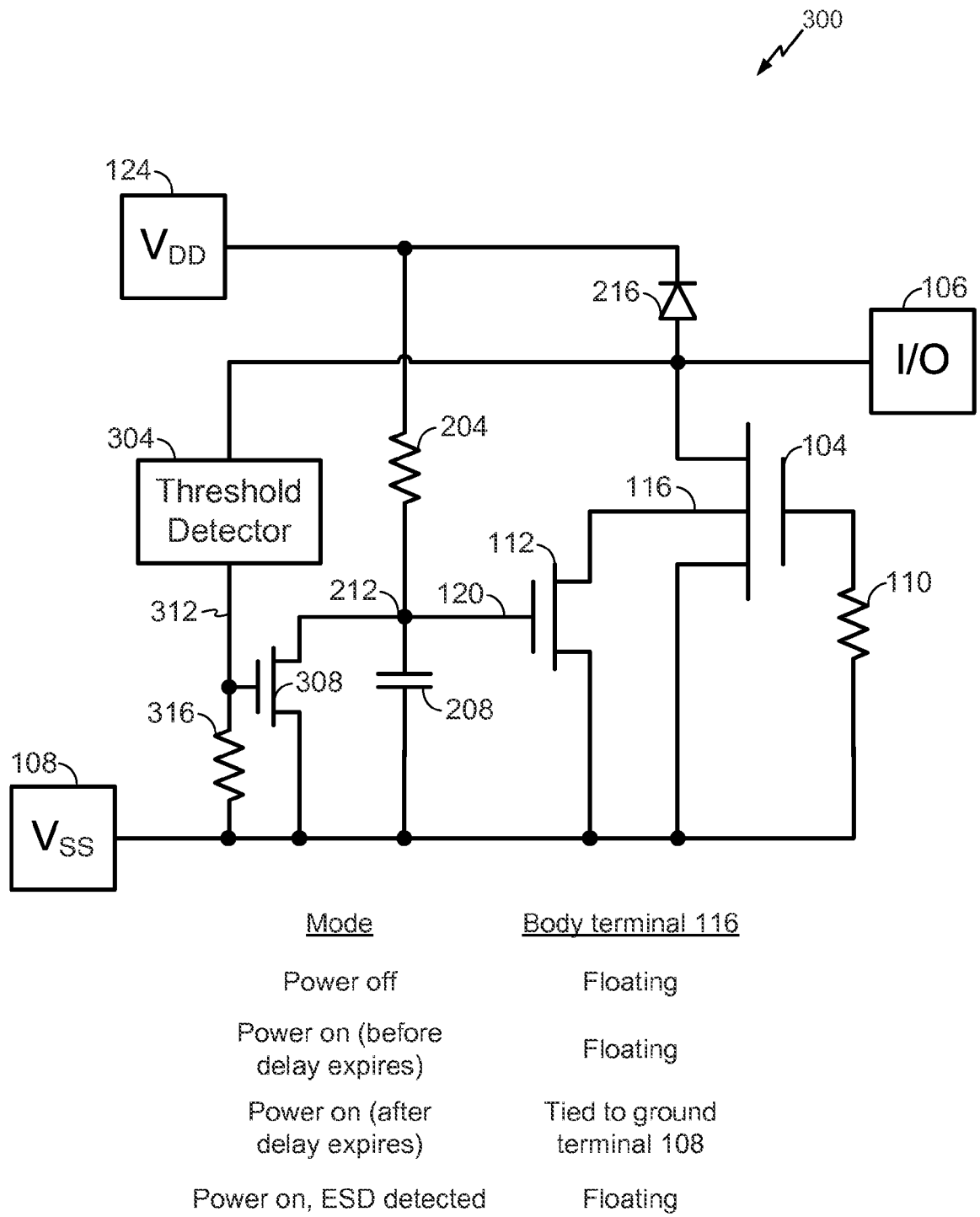
FIG. 3 is a diagram of another illustrative embodiment of a device that includes an ESD clamping transistor with switchable clamping modes of operation.

Referring to FIG. 3, another particular embodiment of a device (e.g., a semiconductor device, such as a portion of an integrated circuit) is depicted and generally designated 300. One or more components of the device 300 may be described with reference to the device 100 of FIG. 1. For example, the device 300 of FIG. 3 includes the ESD clamping transistor 104, the I/O interface 106, the ground terminal 108, the resistor 110, the switch 112, and the power terminal 124. The ESD clamping transistor 104 includes the body terminal 116. The switch 112 includes the control terminal 120. Further, one or more components of the device 300 may be described with reference to the device 200 of FIG. 2. For example, the device 300 of FIG. 3 includes the RC circuit formed by the resistor 204 and the capacitor 208. The RC circuit includes the node 212.

In the example of FIG. 3, the device 300 further includes a threshold detector 304 and a bypass switch 308 coupled to the node 212. The bypass switch 308 is responsive to an output 312 of the threshold detector to selectively couple the control terminal 120 of the switch 112 to the ground terminal 108.

During operation, the device 300 may be powered (e.g., a voltage at the power terminal 124 may be biased according to a power supply voltage level). In response to a voltage at the I/O interface 106 exceeding the power supply voltage level at the power terminal 124 by at least a threshold amount, such as during an ESD event at the I/O interface 106, the threshold detector 304 may cause the output 312 to have a logical high value, activating the bypass switch 308 and coupling the node 212 to the ground terminal 108. By coupling the node 212 to the ground terminal 108, the switch 112 is deactivated and the body terminal 116 is decoupled from the ground terminal 108, causing the ESD clamping transistor 104 to enter the "floating" mode of operation. In at least one embodiment, the threshold amount corresponds to a "worst case" operating voltage associated with acceptable operation of the device 300.

When the voltage at the I/O interface 106 does not exceed the power supply voltage level by at least the threshold amount (e.g., when an ESD event is not occurring at the I/O interface 106), the threshold detector 304 may cause the output 312 to have a logical low value, thus deactivating the bypass switch 308. For example, after an ESD event and in response to the voltage at the I/O interface 106 falling below the power supply voltage level by at least the threshold amount (or by a second threshold amount), the bypass switch 308 may be deactivated and the body terminal 116 may be re-coupled to the ground terminal 108. In at least one embodiment, while the bypass switch 308 is deactivated, operation of the device 300 is generally described with reference to operation of the device 200 of FIG. 2.

Thus, FIG. 3 illustrates that the body terminal 116 may enter a "floating" mode of operation in response to an ESD event that occurs after expiration of the delay period associated with the RC circuit and during operation of the device 300. Use of the threshold amount by the threshold detector 304 may avoid triggering of the floating mode of operation in response to a slight or acceptable voltage deviation at the I/O interface 106. Further, the threshold amount may be set depending on the particular application (e.g., a greater threshold may be set when greater voltage deviations are tolerable and/or expected, depending on the particular application).

According to various embodiments, the threshold detector 304 may include a diode-configured metal-oxide-semiconductor field effect transistor (MOSFET). Alternatively or in addition, the threshold detector 304 may include a triple-well configured diode, a second ESD clamping transistor, or a combination thereof.

Figure 4:
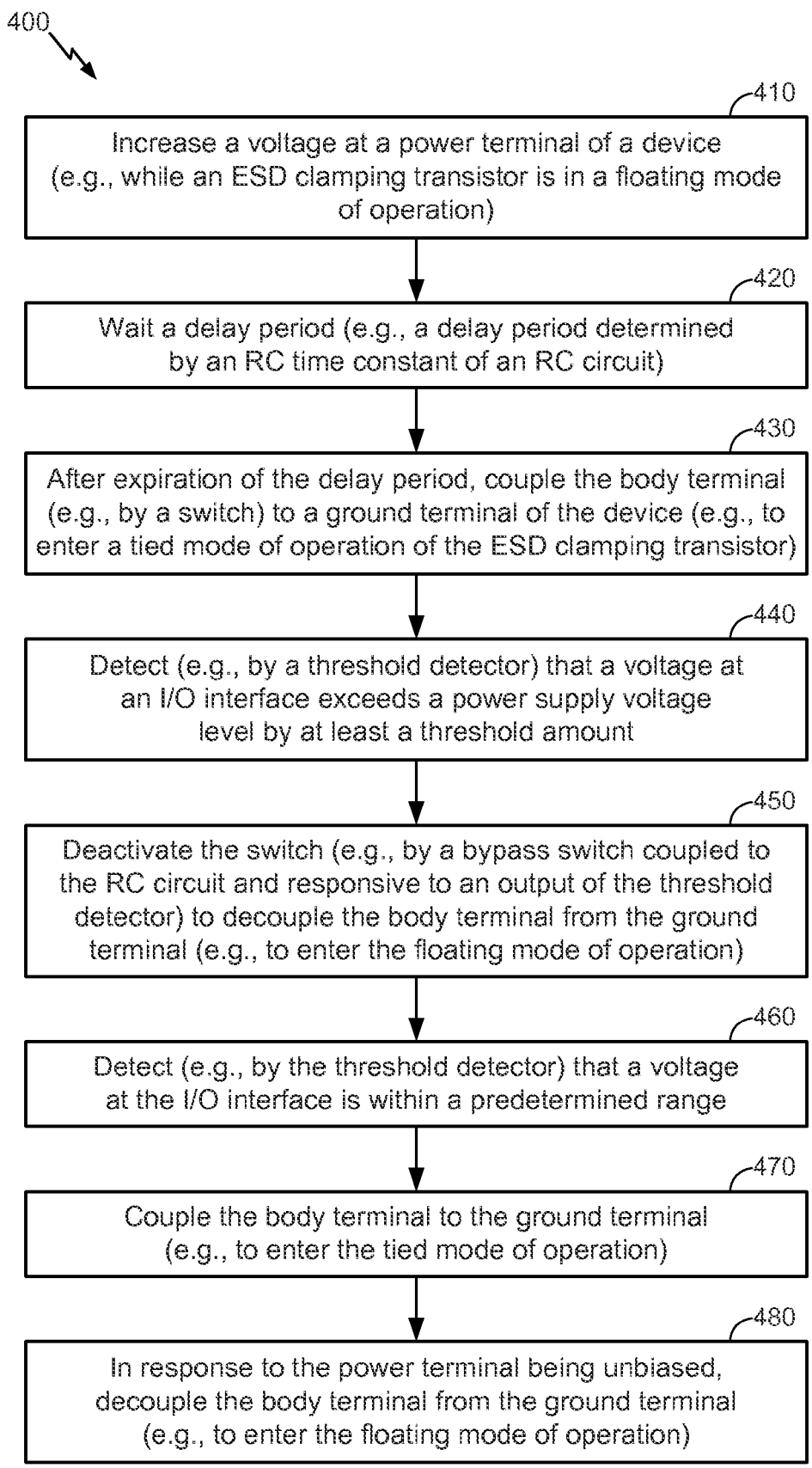
FIG. 4 is a flow chart of a particular illustrative embodiment of a method of operating an ESD clamping transistor with switchable clamping modes of operation.

Referring to FIG. 4, a flow chart of a particular illustrative embodiment of a method of operating an ESD clamping transistor with switchable clamping modes of operation is depicted and generally designated 400. Various operations described with reference to the method 400 may be performed at the device 100 of FIG. 1, the device 200 of FIG. 2, the device 300 of FIG. 3, or a combination thereof.

The method 400 includes increasing a voltage at a power terminal of a device, such as during a power-up sequence, at 410. The voltage at the power terminal may be increased while an ESD clamping transistor is in a floating mode of operation (e.g., while a body terminal of the ESD clamping transistor is not tied to a ground terminal). The device may correspond to the device 100 of FIG. 1, the device 200 of FIG. 2, the device 300 of FIG. 3, or a combination thereof. The power terminal may correspond to the power terminal 124. The body terminal and the ESD clamping transistor may correspond to the body terminal 116 and the ESD clamping transistor 104, respectively.

The method 400 further includes waiting a delay period, at 420. The delay period may be determined by an RC time constant of an RC circuit, such as the RC time constant associated with the RC circuit formed by the resistor 204 and the capacitor 208. After expiration of the delay period, the body terminal is coupled (e.g., "tied" by a switch, such as the switch 112) to a ground terminal (e.g., the ground terminal 108) of the device (e.g., to enter a tied mode of operation of the ESD clamping transistor), at 430. For example, during the power-up sequence, the node 212 may become charged sufficiently to at least partially activate the switch 112 (e.g., a voltage at the node 212 may satisfy a threshold voltage associated with the switch 112). After expiration of the delay period and after the body terminal is coupled to the ground terminal, the power terminal may reach (e.g., "ramp up" to) a normal operating voltage (e.g., $V_{DD}$) associated with normal operation of the device.

The method 400 further includes detecting (e.g., by a threshold detector, such as the threshold detector 304) that a voltage at an input/output (I/O) interface (e.g., the I/O interface 106) exceeds a power supply voltage level (e.g., $V_{DD}$) by at least a threshold amount, at 440. For example, the threshold detector may determine that an ESD event is occurring based on the voltage at the I/O interface exceeding the power supply voltage level by at least the threshold amount.

In response to detecting that the voltage at the I/O interface exceeds the power supply voltage level by at least the threshold amount, a switch is deactivated to decouple the body terminal from the ground terminal (e.g., to enter the floating mode of operation), at 450. The switch may be deactivated by a bypass switch, such as the bypass switch 308, coupled to the RC circuit. The bypass switch may be responsive to an output of the threshold detector, such as the output 312 of the threshold detector 304.

The method 400 further includes detecting (e.g., by the threshold detector) that the voltage at the I/O interface is within a predetermined range (e.g., has decreased below the threshold amount, or below another threshold amount), at 460. At 470, the body terminal is coupled to the ground terminal (e.g., to enter the tied mode of operation). In response to the power terminal being unbiased in response to a power-down event), the body terminal is decoupled from the ground terminal (e.g., to enter the floating mode of operation), at 480.

In connection with FIG. 4, multiple clamping modes of operation (e.g., floating and tied modes of operation) of an ESD clamping transistor (e.g., the ESD clamping transistor 104) are described. Selecting between the multiple clamping modes of operation may enable dynamic calibration of a sensitivity (e.g., a particular voltage in response to which clamping operation is begun) of the ESD clamping transistor. Rapid clamping initiation may be facilitated when less tolerance to voltage fluctuations is appropriate (e.g., during non-operation, or during operation and when an acceptable operating voltage has been exceeded). Slower clamping initiation may be enabled when more tolerance to voltage fluctuations is appropriate during operation at an acceptable operating voltage).

Referring to FIG. 5, a block diagram of a particular illustrative embodiment of a mobile device is depicted and generally designated 500. The mobile device 500 may include a processor 510, such as a digital signal processor (DSP). The processor 510 may be coupled to a memory 532 (e.g., a non-transitory computer-readable medium). The memory 532 may store instructions 562 that are executable by the processor 510. The memory 532 may store data 566 that is accessible to the processor 510.

FIG. 5 also shows a display controller 526 that is coupled to the processor 510 and to a display 528. A coder/decoder (CODEC) 534 can also be coupled to the processor 510. A speaker 536 and a microphone 538 can be coupled to the CODEC 534. FIG. 5 also indicates that a wireless controller 540 can be coupled to the processor 510. The wireless controller 540 may be further coupled to an antenna 542 via a radio frequency (RF) interface 552 (e.g., a transceiver).

In a particular embodiment, the processor 510, the display controller 526, the memory 532, the CODEC 534, and the wireless controller 540 are included in a system-in-package or system-on-chip device 522. An input device 530 and a power supply 544 may be coupled to the system-on-chip device 522. Moreover, in a particular embodiment, and as illustrated in FIG. 5, the display 528, the input device 530, the speaker 536, the microphone 538, the antenna 542, the RF interface 552, and the power supply 544 are external to the system-on-chip device 522. However, each of the display 528, the input device 530, the speaker 536, the microphone 538, the antenna 542, the RF interface 552, and the power supply 544 can be coupled to a component of the system-onchip device 522, such as to an interface or a controller. The display 528, the input device 530, the speaker 536, the microphone 538, the antenna 542, the RE interface 552, the power supply 544, or a combination thereof, may be coupled to the I/O interface 106 of FIGS. 1-3.

The system-on-chip device 522 (or a component thereof) of FIG. 5 includes an ESD protection circuit 560. The ESD protection circuit 560 may be compliant with one or more standards promulgated by the International Electrotechnical Commission (IEC), the Joint Electron Devices Engineering Council (JEDEC), the American National Standards Institute (ANSI), the ESD Association (ESDA), or a combination thereof, The ESD protection circuit 560 may include the device 100 of FIG. 1, the device 200 of FIG. 2, the device 300 of FIG. 3, or a combination thereof. The ESD protection circuit 560 may be coupled to the display 528, the input device 530, the speaker 536, the microphone 538, the antenna 542, the RE interface 552, the power supply 544, or a combination thereof, via the I/O interface 106 of FIGS. 1-3.

The ESD protection circuit 560 includes an n-channel metal-oxide-semiconductor field effect transistor (nMOSFET) 564. The nMOSFET 564 is formed according to a triple-well fabrication process to enable a body terminal of the nMOSFET 564 to be selectively decoupled from a substrate of the system-on-chip device 522. The nMOSFET 564 and the body terminal may correspond to the ESD clamping transistor 104 and the body terminal 116, respectively.

In at least one embodiment, the instructions 562 are executable by the processor 510 after a power-up sequence. The power-up sequence includes selectively coupling a body terminal (e.g., the body terminal 116) of an electrostatic discharge (ESD) clamping transistor (e.g., the ESD clamping transistor 104, the nMOSFET 564, or a combination thereof) to a ground terminal (e.g., the ground terminal 108) of an electronic device (e.g., the mobile device 500) based on a mode of operation of the ESD clamping transistor 104. Selectively coupling the body terminal to the ground terminal may include selectively transitioning the ESD clamping transistor 104 from a "floating" mode of operation to a "tied" mode of operation. For example, the body terminal may selectively transition from being decoupled from the ground terminal to being coupled to the ground terminal. The power-up sequence may include the power-up sequence described with reference to FIG. 2, the power-up sequence described with reference to FIG. 4, or a combination thereof.

After the power-up sequence, the instructions 562 may be executed by the processor 510 to perform one or more operations. For example, after the power-up sequence, the instructions 562 may be executed by the processor 510 to receive input (e.g., user input) via the input device 530, to display data at the display 528 using the display controller 526, to generate audio using the speaker 536 and the CODEC 534, to receive audio using the microphone 538 and the CODEC 534, to access the data 566, to communicate using the wireless controller 540, the RF interface 552, and the antenna 542, to perform another operation, or a combination thereof.

The ESD protection circuit 560 of FIG. 5 may enable improved protection of the mobile device 500 against ESD events while complying with one or more IEC standards. Accordingly, the mobile device 500 may include significant computational capabilities and features, such as those described with reference to FIG. 5, while still discharging ESD events and complying with one or more IEC standards.

In conjunction with the described embodiments, an apparatus is disclosed that includes an electrostatic discharge (ESD) clamping transistor (e.g., the ESD clamping transistor 104, the nMOSFET 564, or a combination thereof) coupled to a ground terminal (e.g., the ground terminal 108) of a device (e.g., the device 100 of FIG. 1, the device 200 of FIG. 2, the device 300 of FIG. 3, or a combination thereof). The apparatus further includes means (e.g., the switch 112) for selectively decoupling a body terminal (e.g., the body terminal 116) of the ESD clamping transistor from the ground terminal based on a mode of operation of the ESD clamping transistor.

The foregoing disclosed devices and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are then cut into semiconductor die and packaged into a semiconductor chip. The chips are then employed in devices described above, FIG. 6 depicts a particular illustrative embodiment of an electronic device manufacturing process 600.

Physical device information 602 is received at the manufacturing process 600, such as at a research computer 606. The physical device information 602 may include design information representing at least one physical property of a device, such as the device 100 of FIG. 1, the device 200 of FIG. 2, the device 300 of FIG. 3, the system-in-chip 522 of FIG. 5, or a combination thereof. For example, the physical device information 602 may include physical parameters, material characteristics, and structure information that is entered via a user interface 604 coupled to the research computer 606. The research computer 606 includes a processor 608, such as one or more processing cores, coupled to a computer-readable medium such as a memory 610. The memory 610 may store computer-readable instructions that are executable to cause the processor 608 to transform the physical device information 602 to comply with a file format and to generate a library file 612.

In a particular embodiment, the library file 612 includes at least one data file including transformed design information. For example, the library file 612 may include a library of devices, such as the device 100 of FIG. 1, the device 200 of FIG. 2, the device 300 of FIG. 3, the system-in-chip 522 of FIG. 5, or a combination thereof, that is provided for use with an electronic design automation (EDA) tool 620.

The library file 612 may be used in conjunction with the EDA tool 620 at a design computer 614 including a processor 616, such as one or more processing cores, coupled to a memory 618. The EDA tool 620 may be stored as processor executable instructions at the memory 618 to enable a user of the design computer 614 to design a circuit including the device 100 of FIG. 1, the device 200 of FIG. 2, the device 300 of FIG. 3, the system-in-chip 522 of FIG. 5, or a combination thereof, of the library file 612. For example, a user of the design computer 614 may enter circuit design information 622 via a user interface 624 coupled to the design computer 614. The circuit design information 622 may include design information representing at least one physical property of a device, such as the device 100 of FIG. 1, the device 200 of FIG. 2, the device 300 of FIG. 3, the system-in-chip 522 of FIG. 5, or a combination thereof. To illustrate, the circuit design property may include identification of particular circuits and relationships to other elements in a circuit design, positioning information, feature size information, interconnection information, or other information representing a physical property of a semiconductor device.

The design computer 614 may be configured to transform the design information, including the circuit design information 622, to comply with a file format. To illustrate, the file formation may include a database binary file format representing planar geometric shapes, text labels, and other information about a circuit layout in a hierarchical format, such as a Graphic Data System (COSH) file format. The design computer 614 may be configured to generate a data file including the transformed design information, such as a GDSII file 626 that includes information describing the device 100 of FIG. 1, the device 200 of FIG. 2, the device 300 of FIG. 3, the system-in-chip 522 of FIG. 5, or a combination thereof, in addition to other circuits or information. To illustrate, the data file may include information corresponding to a system-on-chip (SOC) that includes the device 100 of FIG. 1, the device 200 of FIG. 2, the device 300 of FIG. 3, the system-in-chip 522, of FIG. 5, or a combination thereof, and that also includes additional electronic circuits and components within the SOC.

The GDSII file 626 may be received at a fabrication process 628 to manufacture the device 100 of FIG. 1, the device 200 of FIG. 2, the device 300 of FIG. 3, the system-in-chip 522, of FIG. 5, or a combination thereof, according to transformed information in the GDSII file 626. For example, a device manufacture process may include providing the GDSII file 626 to a mask manufacturer 630 to create one or more masks, such as masks to be used with photolithography processing, illustrated as a representative mask 632. The mask 632 may be used during the fabrication process to generate one or more wafers 634, which may be tested and separated into dies, such as a representative die 636. The die 636 includes the device 100 of FIG. 1, the device 200 of FIG. 2, the device 300 of FIG. 3, the system-in-chip 522 of FIG. 5, or a combination thereof.

The die 636 may be provided to a packaging process 638 where the die 636 is incorporated into a representative package 640. For example, the package 640 may include the single die 636 or multiple dies, such as a system-in-package (SiP) arrangement. The package 640 may be configured to conform to one or more standards or specifications, such as Joint Electron Device Engineering Council (JEDEC) standards.

Information regarding the package 640 may be distributed to various product designers, such as via a component library stored at a computer 646. The computer 646 may include a processor 648, such as one or more processing cores, coupled to a memory 650. A printed circuit board (PCB) tool may be stored as processor executable instructions at the memory 650 to process PCB design information 642 received from a user of the computer 646 via a user interface 644. The PCB design information 642 may include physical positioning information of a packaged semiconductor device on a circuit board, the packaged semiconductor device corresponding to the package 640 including the device 100 of FIG. 1, the device 200 of FIG. 2, the device 300 of FIG. 3, the system-in-chip 522 of FIG. 5, or a combination thereof.

The computer 646 may be configured to transform the PCB design information 642 to generate a data file, such as a GERBER file 652 with data that includes physical positioning information of a packaged semiconductor device on a circuit board, as well as layout of electrical connections such as traces and vias, where the packaged semiconductor device corresponds to the package 640 including the device 100 of FIG. 1, the device 200 of FIG. 2, the device 300 of FIG. 3, the system-in-chip 522 of FIG. 5, or a combination thereof. In other embodiments, the data file generated by the transformed PCB design information may have a format other than a GERBER format.

The GERBER file 652 may be received at a board assembly process 654 and used to create PCBs, such as a representative PCB 656, manufactured in accordance with the design information stored within the GERBER file 652. For example, the GERBER file 652 may be uploaded to one or more machines to perform various steps of a PCB production process. The PCB 656 may be populated with electronic components including the package 640 to form a representative printed circuit assembly (PCA) 658.

The PCA 658 may be received at a product manufacture process 660 and integrated into one or more electronic devices, such as a first representative electronic device 662 and a second representative electronic device 664. As an illustrative, non-limiting example, the first representative electronic device 662, the second representative electronic device 664, or both, may be selected from the group of a set top box, a music player, a video player, an entertainment unit, a navigation device, a communications device, a personal digital assistant (PDA), a fixed location data unit, and a computer, into which the device 100 of FIG. 1, the device 200 of FIG. 2, the device 300 of FIG. 3, the system-in-chip 522 of FIG. 5, or a combination thereof, is integrated. As another illustrative, non-limiting example, one or more of the electronic devices 662 and 664 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

A device that includes the device 100 of FIG. 1, the device 200 of FIG. 2, the device 300 of FIG. 3, the system-in-chip 522 of FIG. 5, or a combination thereof, may be fabricated, processed, and incorporated into an electronic device, as described in the illustrative process 600. One or more aspects of the embodiments disclosed with respect to FIGS. 1-6 may be included at various processing stages, such as within the library file 612, the GDSII file 626, and the GERBER file 652, as well as stored at the memory 610 of the research computer 606, the memory 618 of the design computer 614, the memory 650 of the computer 646, the memory of one or more other computers or processors (not shown) used at the various stages, such as at the board assembly process 654, and also incorporated into one or more other physical embodiments such as the mask 632, the die 636, the package 640, the PCA 658, other products such as prototype circuits or devices (not shown), or any combination thereof. Although various representative stages of production from a physical device design to a final product are depicted, in other embodiments fewer stages may be used or additional stages may be included. Similarly, the process 600 may be performed by a single entity or by one or more entities performing various stages of the process 600.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
   an electrostatic discharge (ESD) clamping transistor coupled to a ground terminal of a device, the ESD clamping transistor comprising a well configuration enabling a body terminal of the ESD clamping transistor to be decoupled from a substrate of the device; and
   a switch coupled between the body terminal of the ESD clamping transistor and the ground terminal.

2. The apparatus of claim 1, wherein the ESD clamping transistor includes an n-channel metal-oxide-semiconductor field effect transistor (nMOSFET) formed according to a triple-well fabrication process.

3. The apparatus of claim 1, wherein a control terminal of the switch is coupled to a power terminal of the device.

4. The apparatus of claim 1, further comprising a resistive-capacitive (RC) circuit having an RC time constant, wherein a control terminal of the switch is coupled to a node of the RC circuit to introduce a delay period prior to activating the switch following a voltage increase at a power terminal of the device, wherein a duration of the delay period is at least partially based on the RC time constant.

5. The apparatus of claim 4, further comprising:
   a threshold detector; and
   a bypass switch coupled to the node of the RC circuit and responsive to an output of the threshold detector to selectively couple the control terminal of the switch to the ground terminal.

6. The apparatus of claim 1, wherein the switch comprises an n-channel metal-oxide-semiconductor field effect transistor (nMOSFET).

7. The apparatus of claim 1, integrated in at least one semiconductor die.

8. The apparatus of claim 1, wherein the device is selected from a communications device, a personal digital assistant (PDA), a set top box, a music player, a video player, an entertainment unit, a navigation device, a fixed location data unit, and a computer, into which the ESD clamping transistor and the switch are integrated.

9. A method comprising:
   selectively decoupling a body terminal of an electrostatic discharge (ESD) clamping transistor from a ground terminal of a device based on a mode of operation of the ESD clamping transistor, the ESD clamping transistor comprising a well configuration enabling the body terminal of the ESD clamping transistor to be decoupled from a substrate of the device.

10. The method of claim 9, wherein the ESD clamping transistor is coupled between a power terminal and the ground terminal, and further comprising, in response to the power terminal being unbiased, decoupling the body terminal from the ground terminal.

11. The method of claim 10, further comprising, in response to a voltage increase at the power terminal, coupling the body terminal to the ground terminal.

12. The method of claim 11, wherein a switch is coupled between the body terminal and the ground terminal, and wherein a control terminal of the switch is coupled to the power terminal.

13. The method of claim 10, further comprising, in response to a voltage increase at the power terminal and after expiration of a delay period, coupling the body terminal to the ground terminal.

14. The method of claim 13, wherein a switch is coupled between the body terminal and the ground terminal, wherein a control terminal of the switch is coupled to a resistive-capacitive (RC) circuit, and wherein the delay period is at least partially based on an RC time constant of the RC circuit.

15. The method of claim 14, further comprising, in response to a voltage at an input/output (I/O) interface exceeding a power supply voltage level by at least a threshold amount, deactivating the switch to decouple the body terminal from the ground terminal.

16. The method of claim 15, wherein a bypass switch is coupled to the RC circuit and is responsive to a threshold detector to selectively couple the control terminal of the switch to the ground terminal.

17. The method of claim 9, wherein the ESD clamping transistor is formed according to a triple-well fabrication process to enable the body terminal to be decoupled from the substrate of the device.

18. The method of claim 9, wherein the ESD clamping transistor is integrated into an electronic device.

19. An apparatus comprising:
   an electrostatic discharge (ESD) clamping transistor coupled to a ground terminal of a device, the ESD clamping transistor comprising a well configuration enabling a body terminal of the ESD clamping transistor to be decoupled from a substrate of the device; and
   means for selectively decoupling the body terminal of the ESD clamping transistor from the ground terminal based on a mode of operation of the ESD clamping transistor.

20. The apparatus of claim 19, wherein the means for selectively decoupling the body terminal comprises a switch coupled between the body terminal and the ground terminal.

21. The apparatus of claim 19, integrated in at least one semiconductor die.

22. The apparatus of claim 19, wherein the device is selected from a communications device, a personal digital assistant (PDA), a set top box, a music player, a video player, an entertainment unit, a navigation device, a fixed location data unit, and a computer, into which the ESD clamping transistor and the means for selectively decoupling the body terminal are integrated.

23. A method comprising:
   a first step for selectively decoupling a body terminal of an electrostatic discharge (ESD) clamping transistor from a ground terminal of a device based on a mode of operation of the ESD clamping transistor, the ESD clamping transistor comprising a well configuration enabling the body terminal of the ESD clamping transistor to be decoupled from a substrate of the device.

24. The method of claim 23, wherein the first step is performed at an electronic device.

25. A non-transitory computer-readable medium storing instructions executable by a computer, the instructions comprising:
  instructions that are executable by the computer after a power-up sequence, wherein the power-up sequence includes selectively coupling a body terminal of an electrostatic discharge (ESD) clamping transistor to a ground terminal of a device based on a mode of operation of the ESD clamping transistor.

26. The non-transitory computer-readable medium of claim 25, wherein the device is selected from a communications device, a personal digital assistant (PDA), a set top box, a music player, a video player, an entertainment unit, a navigation device, a fixed location data unit, and a computer.

27. A method comprising:
  receiving design information representing at least one physical property of a semiconductor device, the semiconductor device comprising:
    an electrostatic discharge (ESD) clamping transistor coupled to a ground terminal; and
    a switch coupled between a body terminal of the ESD clamping transistor and the ground terminal;
  transforming the design information to comply with a file format; and
  generating a data file including the transformed design information.

28. The method of claim 27, wherein the data file has a GDSII format.

29. A method comprising:
  receiving a data file comprising design information corresponding to a semiconductor device; and
  fabricating the semiconductor device according to the design information, wherein the semiconductor device comprises:
    an electrostatic discharge (ESD) clamping transistor coupled to a ground terminal; and
    a switch coupled between a body terminal of the ESD clamping transistor and the ground terminal.

30. The method of claim 29, wherein the data file has a GDSII format.

31. A method comprising:
  receiving design information comprising physical positioning information of a packaged semiconductor device on a circuit board, the packaged semiconductor device comprising:
    an electrostatic discharge (ESD) clamping transistor coupled to a ground terminal; and
    a switch coupled between a body terminal of the ESD clamping transistor and the ground terminal; and
  transforming the design information to generate a data file.

32. The method of claim 31, wherein the data file has a GERBER format.

33. A method comprising:
  receiving a data file including design information comprising physical positioning information of a packaged semiconductor device on a circuit board; and
  manufacturing the circuit board, the circuit board configured to receive the packaged semiconductor device according to the design information, wherein the packaged semiconductor device comprises:
    an electrostatic discharge (ESD) clamping transistor coupled to a ground terminal; and
    a switch coupled between a body terminal of the ESD clamping transistor and the ground terminal.

34. The method of claim 33, wherein the data file has a GERBER format.

35. The method of claim 33, further comprising integrating the circuit board into a device selected from a communications device, a personal digital assistant (PDA), a set top box, a music player, a video player, an entertainment unit, a navigation device, a fixed location data unit, and a computer.

* * * * *